(12) United States Patent
Kaifu et al.

(10) Patent No.: US 7,834,124 B2
(45) Date of Patent: *Nov. 16, 2010

(54) KETONE-MODIFIED RESORCINOL-FORMALIN RESIN

(75) Inventors: Nobuo Kaifu, Kanagawa (JP); Hiroshi Nakaoka, Kanagawa (JP); Hisatoshi Koinuma, Kanagawa (JP)

(73) Assignee: Hodogaya Chemical Co., Ltd., Kawasaki-shi (JP)

( * ) Notice: Subject to any disclaimer, the term of this patent is extended or adjusted under 35 U.S.C. 154(b) by 147 days.

This patent is subject to a terminal disclaimer.

(21) Appl. No.: 11/814,521

(22) PCT Filed: Jan. 25, 2006

(86) PCT No.: PCT/JP2006/301107

§ 371 (c)(1),
(2), (4) Date: Jul. 23, 2007

(87) PCT Pub. No.: WO2006/080331

PCT Pub. Date: Aug. 3, 2006

(65) Prior Publication Data

US 2009/0018304 A1      Jan. 15, 2009

(30) Foreign Application Priority Data

Jan. 25, 2005   (JP)   ............... 2005-016604

(51) Int. Cl.
*C08G 8/00*   (2006.01)
*C08G 8/02*   (2006.01)
*C08G 8/26*   (2006.01)
*C08G 14/00*  (2006.01)

(52) U.S. Cl. ............... 528/155; 528/125; 528/127
(58) Field of Classification Search ............... 528/125, 528/155, 127
See application file for complete search history.

(56) References Cited

U.S. PATENT DOCUMENTS 1,614,172 A * 1/1927 Amann et al. ............... 528/165

(Continued)

FOREIGN PATENT DOCUMENTS

EP       0 498 301 A2    8/1992

(Continued)

OTHER PUBLICATIONS

Machine Translation of JP 2005133085 A 2009.*

(Continued)

*Primary Examiner*—Mark Eashoo
*Assistant Examiner*—Liam J Heincer
(74) *Attorney, Agent, or Firm*—Oblon, Spivak, McClelland, Maier & Neustadt, L.L.P.

(57) ABSTRACT

It is an object of the invention to provide a ketone-modified resorcinol-formalin resin, which has a moderate flowability when transformed into an aqueous solution and has both a reduced content of resorcinol monomer and a reduced content of resorcinol-formalin resin of resorcinol pentanuclear or higher nuclear bodies. The invention relates to a ketone-modified resorcinol-formalin resin, which is produced by a two-step reaction and wherein a peak area corresponding resorcinol monomer is 3 to 9% and a peak area corresponding to resorcinol pentanuclear and higher nuclear bodies is 30 to 55% relative to the total peak area obtained by gel permeation chromatographic analysis of the resorcinol-formalin resin.

20 Claims, 3 Drawing Sheets

U.S. PATENT DOCUMENTS

| | | | | |
|---|---|---|---|---|
| 1,624,082 | A | * | 4/1927 | Terwilliger .................. 524/66 |
| 1,883,415 | A | * | 10/1932 | Seebach ..................... 525/480 |
| 2,069,725 | A | * | 2/1937 | Rust .......................... 528/128 |
| 2,079,210 | A | * | 5/1937 | Honel ...................... 528/158.5 |
| 2,538,883 | A | * | 1/1951 | Schrimpe ................... 525/493 |
| 3,006,883 | A | * | 10/1961 | Cambron .................... 528/127 |
| 3,133,034 | A | * | 5/1964 | St. Clair et al. ............. 524/841 |
| 3,321,358 | A | * | 5/1967 | Campbell et al. ........... 428/528 |
| 3,390,127 | A | * | 6/1968 | Schick et al. ............... 528/127 |
| 3,409,571 | A | * | 11/1968 | Shepard et al. ............. 162/159 |
| 3,412,068 | A | * | 11/1968 | Gemmill, Jr. et al. ......... 528/87 |
| 3,814,713 | A | * | 6/1974 | Tanaka ....................... 524/510 |
| 3,919,151 | A | * | 11/1975 | Moult et al. ................ 524/594 |
| 4,034,012 | A | * | 7/1977 | Gillern ....................... 525/521 |
| 4,158,650 | A | * | 6/1979 | Kato et al. .................. 528/155 |
| 4,241,201 | A | * | 12/1980 | Annis ......................... 525/503 |
| 4,314,050 | A | * | 2/1982 | Girgis ........................ 528/140 |
| 4,345,054 | A | * | 8/1982 | Takeda et al. ............... 525/480 |
| 4,376,854 | A | * | 3/1983 | Yamaguchi et al. ......... 528/137 |
| 4,812,551 | A | * | 3/1989 | Oi et al. ..................... 528/129 |
| 4,876,324 | A | * | 10/1989 | Nakano et al. .............. 528/142 |
| 4,997,804 | A | * | 3/1991 | Pekala ........................ 502/418 |
| 5,051,454 | A | * | 9/1991 | Lemon et al. ............... 523/146 |
| 5,075,414 | A | * | 12/1991 | Dailey, Jr. ................... 528/129 |
| 5,075,415 | A | * | 12/1991 | Yotsumoto et al. .......... 528/149 |
| 5,089,589 | A | * | 2/1992 | Hesse et al. ................. 528/129 |
| 5,372,909 | A | * | 12/1994 | Nishi et al. .................. 430/192 |
| 5,412,058 | A | * | 5/1995 | Dreyfus et al. .............. 528/129 |
| 5,521,259 | A | * | 5/1996 | Tsumura et al. ............. 525/481 |
| 5,646,219 | A | * | 7/1997 | Teodorczyk ................ 525/524 |
| 5,705,597 | A | * | 1/1998 | Ortelt et al. ................. 528/128 |
| 5,928,836 | A | * | 7/1999 | Rahman et al. .......... 430/270.1 |
| 5,945,500 | A | * | 8/1999 | Durairaj et al. ............... 528/96 |
| 2001/0024762 | A1 | * | 9/2001 | Miyagi et al. ............... 430/192 |
| 2002/0010288 | A1 | * | 1/2002 | Ueda et al. .................. 525/507 |
| 2004/0162391 | A1 | * | 8/2004 | Durairaj et al. .............. 525/139 |
| 2007/0225462 | A1 | * | 9/2007 | Kaifu et al. ................. 526/313 |

FOREIGN PATENT DOCUMENTS

| | | |
|---|---|---|
| JP | 48-12185 | 4/1973 |
| JP | 49-14550 | 4/1974 |
| JP | 54 932 | 1/1979 |
| JP | 57 115413 | 7/1982 |
| JP | 57 143316 | 9/1982 |
| JP | 57-167342 | 10/1982 |
| JP | 4-148920 | 5/1992 |
| JP | 6-100850 | 4/1994 |
| JP | 2000-178849 | 6/2000 |
| JP | 2003 277308 | 10/2003 |
| JP | 2005133085 A * | 5/2005 |

OTHER PUBLICATIONS

Machine Translation of JP 2003277308 A 2009.*
U.S. Appl. No. 12/443,489, filed Mar. 30, 2009, Kaifu, et al.
U.S. Appl. No. 10/574,774, filed May 1, 2007, Kaifu, et al.

* cited by examiner

KETONE-MODIFIED RESORCINOL-FORMALIN RESIN

TECHNICAL FIELD

The present invention relates to a ketone-modified resorcinol-formalin resin, which has both a reduced content of resorcinol monomer and a reduced content of resorcinol-formalin resin of resorcinol pentanuclear or higher nuclear bodies, gives less deterioration of working environment induced by sublimation of unreacted resorcinol upon use as an adhesive, and has an excellent adhesiveness, as a result of control of the molecular weight of the resorcinol-formalin resin and modification of the resin with a ketone.

BACKGROUND ART

Hitherto, since resorcinol-formalin resins have been used for adhesives, plywood, glued laminated timber, surface coating agents, and the like owing to their fast curing rate and, in particular, they are used as tire adhesives and rubber hose adhesives owing to their excellent adhesive force to rubber and fiber (For example, cf. Patent Documents 1, 2, 3, and 4).

In the case that a resorcinol-formalin resin is used as an adhesive, it is required that the resorcinol-formalin resin has a sufficient flowability and, when a solvent coexists, the resin is homogeneously dissolved therein. When the flowability is focused on, it is empirically known that a sufficient flowability is obtained by reducing the composition ratio of resorcinol pentanuclear or higher nuclear bodies among the constitutive components of a polycondensate. It has been considered that the resorcinol pentanuclear or higher nuclear bodies contain a rapidly increased ratio of three-dimensional structures and hence the flowability is lost. Moreover, it is also possible to dilute the resin with an organic solvent in order to impart the flowability but the use of the organic solvent is not preferable since the use may possibly result in deteriorated working environment and lowering of adhesive force. There is a method of dispersing the resin in water by the action of an anionic surfactant without using any organic solvent to prepare an adhesive (for example, cf. Patent Document 5) but there still remains an anxiety of long-term stability of the resulting water dispersion system.

For the purpose of reducing the content of unreacted formaldehyde in a resin, there is a report wherein a resin is produced by a two-step reaction (for example, cf. Patent Document 6). It is a patent application relating to a process for producing an aldehyde resin to be used as an adhesive for water-repellant paper products such as cardboard. In Examples therein, a first-step reaction is conducted between formaldehyde and methyl ethyl ketone and then a second-step reaction is carried out between the resulting product and resorcinol, thereby the formaldehyde content of the product being reduced to 0.1%. However, the aldehyde resin is not an application of resorcinol-formalin resins.

Patent Document 1: JP-B-48-12185
Patent Document 2: JP-A-4-148920
Patent Document 3: JP-A-6-100850
Patent Document 4: JP-A-2000-178849
Patent Document 5: JP-A-57-167342
Patent Document 6: EP0498301A2

As mentioned above, it is known that a sufficient flowability is obtained in the case that the solvent is water by lowering the composition ratio of resorcinol pentanuclear or higher nuclear bodies among the constitutive components of the polycondensate. However, the case that the reaction conditions are set mild so as to reduce the composition ratio of resorcinol pentanuclear or higher nuclear bodies only results in the shift of the molecular weight distribution of the product to a low-molecular-weight side and usually, the concentration of unreacted resorcinol increases. When the concentration of resorcinol increases, there is a possibility that resorcinol is sublimated upon use as an adhesive to deteriorate working environment and further to lower adhesive force, so that the case is not preferred. When 0.6 mol of formaldehyde is reacted with 1 mol of resorcinol, about 33% by weight of unreacted resorcinol is contained after the completion of the reaction and when 0.8 mol of formaldehyde is reacted, about 20% by weight of unreacted resorcinol is contained. Therefore, in order to reduce the amount of unreacted resorcinol to 15% by weight, it has been reported that resorcinol is removed by sublimation under reduced pressure of 0.05 mmHg at 130° C. so as to reduce the content of unreacted resorcinol (for example, cf. Patent Document 7). Moreover, it has been reported that the content of unreacted resorcinol is reduced to 5.5% by using methyl isobutyl ketone as a solvent and water as an extracting agent by means of a continuous extractor (for example, cf. Patent Document 8). However, these processes are industrially disadvantageous since vacuum distillation is required after the completion of the reaction or a long-time operation is required using the continuous extractor.

To the contrary, when severer reaction conditions are adopted in order to lower the concentration of unreacted resorcinol, resorcinol polynuclear bodies of pentanuclear or higher nuclear bodies are formed in a large amount and hence the case is not preferred. Since the reaction is conducted in an aqueous system, it may be possible to use a method of adding a high concentration of a salt after the completion of the reaction to lower the solubility of the polymeric components and removing them after their precipitation. However, this method requires further incorporation of the salting-out step and hence is disadvantageous. In addition, there is a fear of lowered adhesive force owing to the remaining inorganic salt in the resorcinol-formalin resin or corrosion of substrate to be adhered attributable to the inorganic salt, so that the method is not practiced. A means for achieving no increase in the composition ratio of heptanuclear or higher nuclear bodies even in a one-stage reaction without incorporating the salting-out step is disclosed (for example, Patent Document 9). It is a method of coexisting a large amount of a salt in the reaction system in order to reduce the solubility of the resorcinol polynuclear bodies. In this method, since the resorcinol polynuclear bodies precipitated from the aqueous phase form a gummy matter, resorcinol is also incorporated into the gummy matter and, as a result, a decrease in the reaction rate is invited, which results in a prolonged reaction time. In industrial production, the formation of a gummy matter in a long-term reaction induces discontinuation of stirring, choking of liquid transferring system, and the like, so that it is difficult to adopt the method.

Patent Document 7: JP-B-54-932
Patent Document 8: JP-B-49-14550
Patent Document 9: JP-A-2003-277308

DISCLOSURE OF THE INVENTION

Problems to be Solved by the Invention

An object of the invention is to provide a ketone-modified resorcinol-formalin resin produced by a production process wherein all steps are conducted in one identical reaction vessel, which has a moderate flowability when transformed into an aqueous solution and has both a reduced content of resorcinol monomer and a reduced content of ketone-modified resorcinol-modified resin of resorcinol pentanuclear or higher nuclear bodies and resorcinol-formalin resin of resorcinol pentanuclear or higher nuclear bodies.

Means for Solving the Problems

The invention relates to a ketone-modified resorcinol-formalin resin, which is a resin (G) obtained by adding and dissolving, into a water solvent, resorcinol (A) in an amount of 100 to 200 parts by weight relative to 100 parts by weight of water, adding an organic acid or inorganic acid (B1) as a catalyst in an amount of 0.2 to 0.6 part by weight relative to 100 parts by weight of water, adding 1 to 40% formalin (C) dropwise in a molar ratio relative to resorcinol (A) in terms of formaldehyde/resorcinol of 0.3 to 0.8 under stirring over a period of 1 to 300 minutes while maintaining the reaction system at 0 to 150° C., stirring the mixture for further 20 to 90 minutes after the completion of the dropwise addition to cause a reaction to proceed, neutralizing the mixture with adding 1 to 30% ammonia water (D1) in an amount of 1.0 to 2.0 molar equivalents relative to the organic acid or inorganic acid (B1) after cooling, adding an extracting solvent (E) in an amount of 1 to 5 equivalents relative to resorcinol (A) to the reaction solution to effect extraction, repeating the extraction step N times, subjecting the remaining aqueous layer to azeotropic distillation to remove the residual extracting solvent (E), cooling the residue to obtain a resorcinol-formalin condensation liquid (F), adding 10 to 80 parts by weight of a liquid ketone (H) represented by the general formula [1] and 0.1 to 1.5 parts by weight of an organic or inorganic acid (B2) as a catalyst to 100 parts by weight of the condensation liquid (F), elevating the temperature to 50 to 100° C., continuing the reaction for 5 to 24 hours while maintaining the temperature, adding 10 to 50 parts by weight of water to 100 parts by weight of the reaction solution after the completion of the reaction, removing by azeotropic distillation the liquid ketone (H) and water in an amount to be removed by the azeotropic distillation, taking out the remaining water layer part, and neutralizing it with 1 to 30% ammonia water (D2), and wherein a peak area corresponding resorcinol monomer is 3 to 9% and a peak area corresponding to resorcinol pentanuclear and higher nuclear bodies is 30 to 55% relative to the total peak area obtained by gel permeation chromatographic analysis of the resin (G), and to a process for producing a ketone-modified resorcinol-formalin resin comprising the above steps, provided that N represents an integer of 2 to 5:

[Chemical Formula 1]

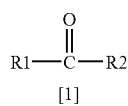

[1]

wherein R1 and R2 are the same or different from each other and each represents a methyl group, an ethyl group, an n-propyl group, a 2-propyl group, an n-butyl group, a secondary-butyl group, an isobutyl group, or a tertiary-butyl group.

In the invention, it is also possible to intermittently added dropwise the 1 to 40% formalin (C) in a molar ratio relative to resorcinol (A) in terms of formaldehyde/resorcinol of 0.3 to 0.8 under stirring over a period of 20 to 300 minutes.

A preferred embodiment of the invention is the ketone-modified resorcinol-formalin resin, which is a resin (G) obtained by adding 20 to 80 parts by weight of the liquid ketone (H) represented by the general formula [1] and 0.1 to 1.5 parts by weight of the organic or inorganic acid (B2) as a catalyst to 100 parts by weight of the resorcinol-formalin condensation liquid (F), carrying out the reaction for 5 to 24 hours at a temperature equal to or lower than azeotropic temperature of water and the liquid ketone (H), adding 10 to 50 parts by weight of water to 100 parts by weight of the reaction solution after the completion of the reaction, removing by azeotropic distillation the liquid ketone (H) and water in an amount to be removed by the azeotropic distillation, taking out the remaining water layer part, and neutralizing it with 1 to 30% ammonia water (D2) and which has finally a reaction product concentration of 30 to 80% by weight and has an appropriate flowability, and also the process for producing a ketone-modified resorcinol-formalin resin, having the above features.

The liquid ketone (H) is an organic solvent capable of dissolving a ketone-modified resorcinol-formalin resin in an amount of 1 g or more in 100 g of the liquid ketone (H). Moreover, it may be used as a mixture of one or more kinds selected from these liquid ketones (H).

Specific examples of the liquid ketone (H) represented by the general formula [1] include acetone, methyl ethyl ketone, and methyl isobutyl ketone. Of these, preferred is methyl ethyl ketone wherein R1 is a methyl group and R2 is an ethyl group. In the invention, the liquid ketone (H) represented by the general formula [1] contributes the modification of the resorcinol-formalin resin. It is considered that the ketone-modified resorcinol-formalin resin of the invention has improved adhesive performances due to the ketone-modification.

The ketone-modified resorcinol-formalin resin of the invention is characterized in that it is produced by two-step reaction of: a condensation reaction between resorcinol and formaldehyde; and a modification of the resorcinol-formalin resin with a ketone. In the condensation reaction between resorcinol and formaldehyde, the molecular weight of the product usually increases with each increment of 122. On the other hand, in the modification with a ketone, for example, in the case of methyl ethyl ketone, the increment of the molecular weight is 72 that is the molecular weight of methyl ethyl ketone or 54 as a result of association of dehydration reaction thereof. Accordingly, there is an advantage that reaction design for controlling the molecular weight of the product within a proper range is more easily accomplished by the ketone-modification.

In the reaction of the first step and the reaction of the second step, since each reaction is controlled so that the components of pentanuclear or higher nuclear bodies do not increase, the reaction product finally obtained has an appropriate flowability although it is a mixture with water. In addition, it is also advantageous that the production process is a process wherein all the steps until the final product is obtained are conducted in one identical reaction vessel.

As the organic acid or inorganic acid (B2) which is used as a catalyst in the process for producing the ketone-modified resorcinol-formalin resin, there may be mentioned hydrochloric acid, sulfuric acid, phosphoric acid, benzenesulfonic acid, toluenesulfonic acid, and the like. Preferred is hydrochloric acid.

ADVANTAGE OF THE INVENTION

The ketone-modified resorcinol-formalin resin of the invention can be produced by a process wherein all the steps can be conducted in one identical reaction vessel and the resin has both a reduced content of resorcinol monomer and a reduced content of ketone-modified resorcinol-modified resin of resorcinol pentanuclear or higher nuclear bodies and resorcinol-formalin resin of resorcinol pentanuclear or higher nuclear bodies and has a molecular weight within an appropriate range, so that the resin has an appropriate flowability when transformed into an aqueous solution and gives less deterioration of working environment induced by sublimation of unreacted resorcinol upon use as an adhesive as a result of control of the molecular weight of the resorcinol-formalin resin within a proper range, as well as the resin has an excellent adhesive force as a result of ketone-modification.

BEST MODE FOR CARRYING OUT THE INVENTION

Figure 1:
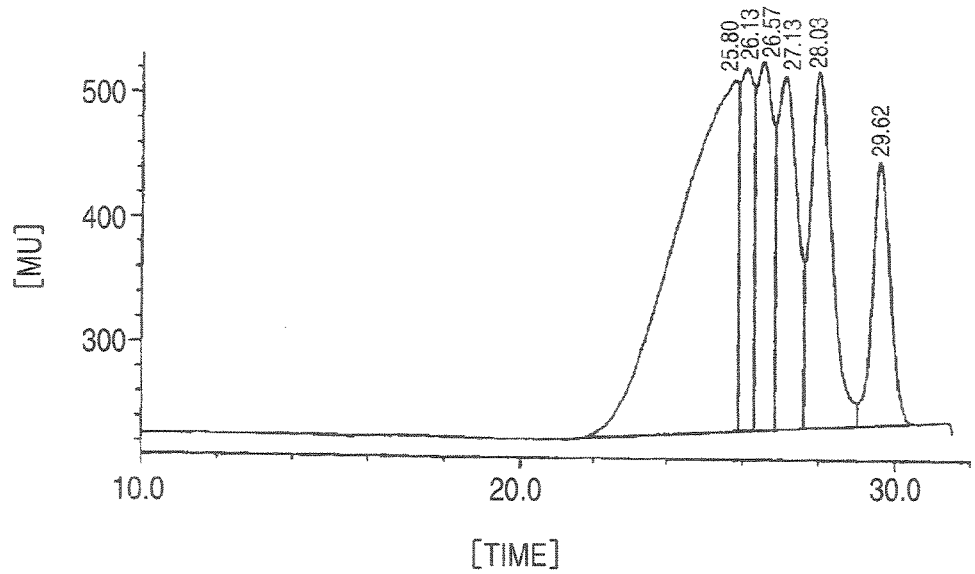
FIG. 1 is a gel permeation chromatogram of the resin obtained in Example 1.

As the reaction vessel to be used in the production, a usual apparatus can be used as far as it is acid resistant since an acid-catalyzed reaction is carried out. The pH of the reaction solution before the azeotropic distillation is preferably in the range of 4 to 7 and the pH of the reaction solution after the azeotropic distillation is preferably in the range of 7 to 10.

The organic solvent to be used in the production of the invention can be collected by distillation and reused. Examples of the organic solvent to be used include aromatic hydrocarbons such as toluene and xylene and ketones such as methyl ethyl ketone and methyl isobutyl ketone as well as esters such as ethyl acetate and butyl acetate.

The concentration of formaldehyde in the formalin (C) to be used in the invention is 1 to 40%, preferably 30 to 40%. Moreover, the amount of formalin to be used is an amount so that the molar ratio of formaldehyde in formalin relative to resorcinol (A) is in a molar ratio of formaldehyde/resorcinol of 0.3 to 0.8, preferably 0.5 to 0.8.

The time for dropwise addition of formalin (C) conducted under stirring is 1 to 300 minutes, preferably 20 to 120 minutes, more preferably 60 to 120 minutes.

The following will describe the invention in detail with reference to Examples.

Example 1

After 280 g of water and 523.6 g of resorcinol were placed in a 2 L flask made of glass and the whole dissolved at 50° C., 1.2 g of p-toluenesulfonic acid was charged into the reaction vessel. While the reaction system was maintained at 120 to 125° C., 224.0 g of 37% formalin (molar ratio of formaldehyde/resorcinol=0.58) was added dropwise over a period of 300 minutes and, after the completion of the dropwise addition, the mixture was further stirred for 60 minutes to cause a reaction to proceed. After the temperature of the reaction system was cooled to room temperature, 792 mL of toluene was added to a neutralized solution neutralized with 0.7 g of 25% ammonia water, followed by extraction. The extraction step was repeated four times and 524 g of water was charged. After azeotropic distillation, the residue was cooled to obtain 793 g of a resorcinol-formalin condensation liquid (content of resorcinol: about 8%, solid content: 444 g) (resin before ketone-modification). After 311 g of methyl ethyl ketone (39.2% relative to the resorcinol-formalin condensation liquid) was added to the resorcinol-formalin condensation liquid and the whole was mixed under stirring, 7.7 g of 35% hydrochloric acid (catalyst) was added thereto, followed by 24 hours of a reaction at 70° C. After completion of the reaction, the mixture was cooled to room temperature and neutralized to pH 5 with 25% ammonia water. After 250 g of water was further added and methyl ethyl ketone was removed by azeotropic distillation, the residue was again cooled to room temperature and 25% ammonia water was added until the pH 8 to 9 was achieved. Then, water was added to adjust solid content to 50% by weight to obtain 932 g of a ketone-modified resorcinol-formalin resin having a reduced content of resorcinol and resorcinol-formalin resins of resorcinol pentanuclear or higher nuclear bodies (content of resorcinol: 8.6%, solid content: 466 g).

The resulting ketone-modified resorcinol-formalin resin was dissolved in tetrahydrofuran and the solution was subjected to gel permeation chromatographic analysis, whereby the distribution of unreacted resorcinol to resorcinol pentanuclear and higher nuclear bodies was measured. The resulting chromatogram is shown in FIG. 1. The peak area ratios on the resulting chromatogram are as follows.

| | |
|---|---|
| Resorcinol | 8.6% |
| Resorcinol dinuclear body | 14.2% |
| Resorcinol trinuclear body | 13.3% |
| Resorcinol tetranuclear body | 11.5% |
| Resorcinol pentanuclear and higher nuclear bodies | 52.4% |

The following shows the conditions for the gel permeation chromatographic analysis adopted.

Figure 2:
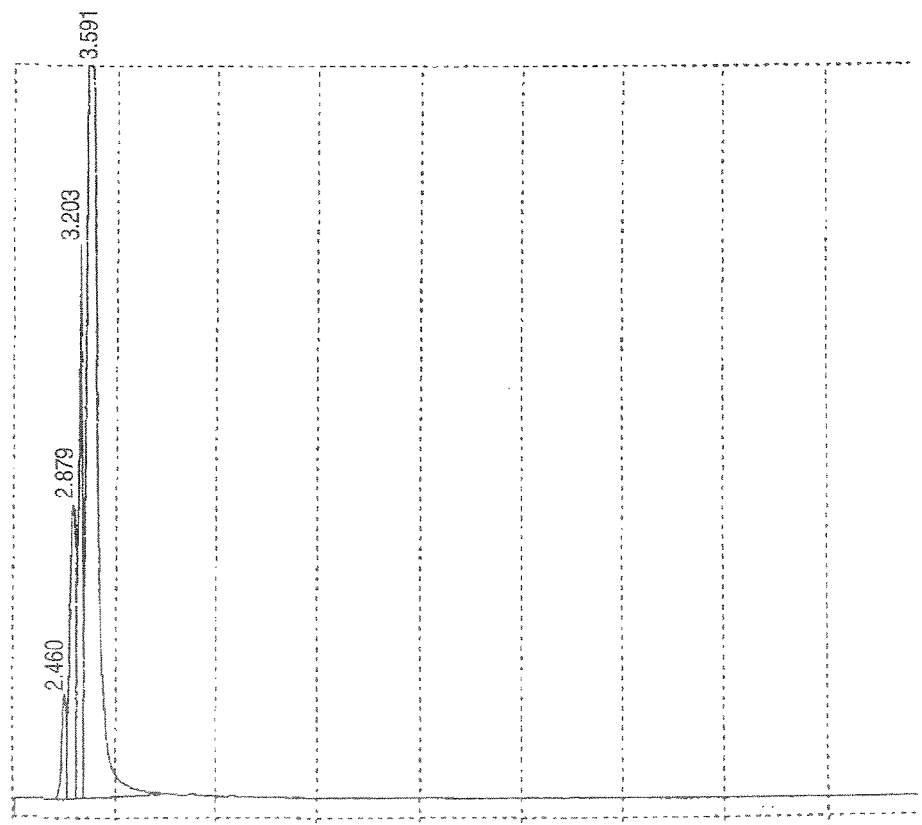
FIG. 2 is a liquid chromatogram of the resin before ketone-modification obtained in Example 1.
Figure 3:
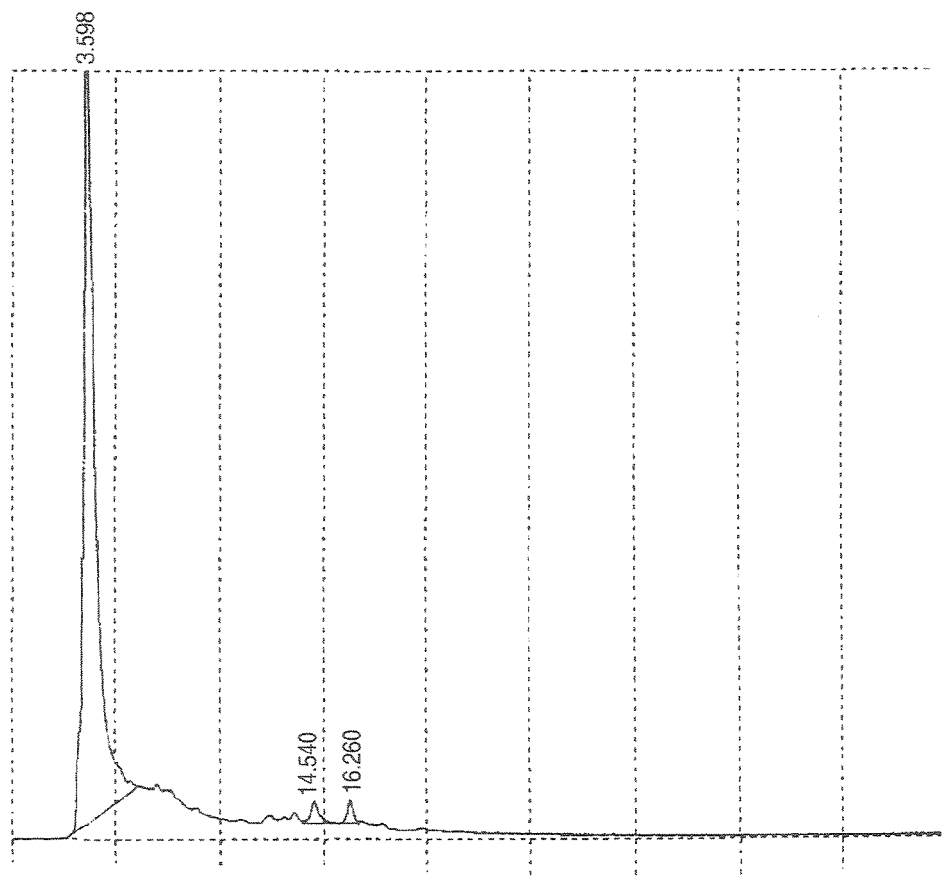
FIG. 3 is a liquid chromatogram of the ketone-modified resin obtained in Example 1.

Model for measurement: HLC-8020 manufactured by Tosoh Corporation
Columns: (G-2500)+(G-2500)+(G-4000) manufactured by Tosoh Corporation
Column temperature: 40° C.
Solvent: tetrahydrofuran
Flow rate: 1 ml/min The resulting resorcinol-formalin resin before ketone-modification and ketone-modified resorcinol-formalin resin were subjected to liquid chromatographic analysis. The results obtained are shown in FIGS. 2 and 3. It is revealed that new peaks appear before and after 15 minutes as a result of the ketone-modification in the case of the ketone-modified resorcinol-formalin resin. There is a possibility that these components may enhance adhesive performance and the like.

The following shows the conditions for the liquid chromatographic analysis adopted.

Model for measurement: HPLC SPC-6AV manufactured by Shimadzu Corporation
Columns: DEVELOSIL ODS-UG-5
Column temperature: 40° C.
Detector: UV (254 nm)
Solvent: methanol/water
Flow rate: 0.8/min

Example 2

After 280 g of water and 523.6 g of resorcinol were placed in a 2 L flask made of glass and the whole dissolved at 50° C., 1.2 g of p-toluenesulfonic acid was charged into the reaction vessel. While the reaction system was maintained at 120 to 125° C., 204.6 g of 37% formalin (molar ratio of formaldehyde/resorcinol=0.53) was added dropwise over a period of 300 minutes and, after the completion of the dropwise addition, the mixture was further stirred for 60 minutes to cause a reaction to proceed. After the temperature of the reaction system was cooled to room temperature, 916 mL of toluene was added to a neutralized solution neutralized with 0.7 g of 25% ammonia water, followed by extraction. The extraction step was repeated four times and 524 g of water was charged. After azeotropic distillation, the residue was cooled to obtain 742 g of a resorcinol-formalin condensation liquid (content of resorcinol: about 8%, solid content: 415 g) (resin before ketone-modification). After 260 g of methyl ethyl ketone (35.0% relative to the resorcinol-formalin condensation liquid) was added to the resorcinol-formalin condensation liquid and the whole was mixed under stirring, 7.7 g of 35% hydrochloric acid (catalyst) was added thereto, followed by 20 hours of a reaction at 70° C. After completion of the reaction, the mixture was cooled to room temperature and neutralized to pH 5 with 25% ammonia water. After 250 g of water was further added and methyl ethyl ketone was removed by azeotropic distillation, the residue was again cooled to room temperature and 25% ammonia water was added until the pH 8 to 9 was achieved. Then, water was added to adjust solid content to 50% by weight to obtain 872 g of a ketone-modified resorcinol-formalin resin having a reduced content of resorcinol and resorcinol-formalin resins of resorcinol pentanuclear or higher nuclear bodies (content of resorcinol: 8.7%, solid content: 436 g).

Figure 4:
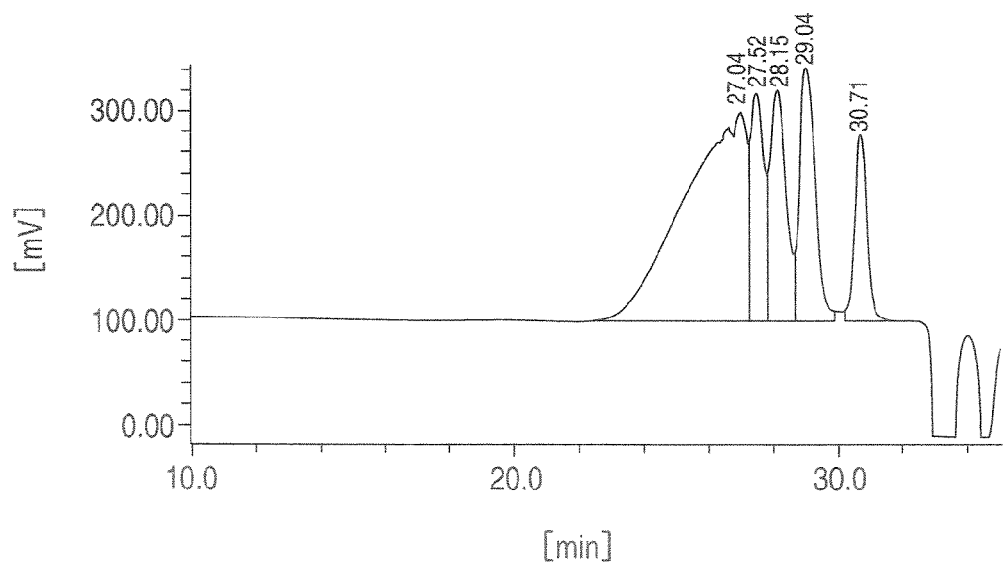
FIG. 4 is a gel permeation chromatogram of the resin obtained in Example 2.

The resulting ketone-modified resorcinol-formalin resin was dissolved in tetrahydrofuran and the solution was subjected to gel permeation chromatographic analysis, whereby the distribution of unreacted resorcinol to resorcinol pentanuclear and higher nuclear bodies was measured. The resulting chromatogram is shown in FIG. 4. The peak area ratios on the resulting chromatogram are as follows.

| | |
|---|---|
| Resorcinol | 8.7% |
| Resorcinol dinuclear body | 15.3% |
| Resorcinol trinuclear body | 14.5% |
| Resorcinol tetranuclear body | 12.3% |
| Resorcinol pentanuclear and higher nuclear bodies | 49.3% |

Example 3

After 280 g of water and 523.6 g of resorcinol were placed in a 2 L flask made of glass and the whole dissolved at 50° C., 1.2 g of p-toluenesulfonic acid was charged into the reaction vessel. While the reaction system was maintained at 120 to 125° C., 250.9 g of 37% formalin (molar ratio of formaldehyde/resorcinol=0.65) was added dropwise over a period of 300 minutes and, after the completion of the dropwise addition, the mixture was further stirred for 60 minutes to cause a reaction to proceed. After the temperature of the reaction system was cooled to room temperature, 720 mL of toluene was added to a neutralized solution neutralized with 0.7 g of 25% ammonia water, followed by extraction. The extraction step was repeated four times and 524 g of water was charged. After azeotropic distillation, the residue was cooled to obtain 851 g of a resorcinol-formalin condensation liquid (content of resorcinol: about 8%, solid content: 477 g) (resin before ketone-modification). After 260 g of methyl ethyl ketone (30.6% relative to the resorcinol-formalin condensation liquid) was added to the resorcinol-formalin condensation liquid and the whole was mixed under stirring, 7.7 g of 35% hydrochloric acid (catalyst) was added thereto, followed by 20 hours of a reaction at 70° C. After completion of the reaction, the mixture was cooled to room temperature and neutralized to pH 5 with 25% ammonia water. After 250 g of water was further added and methyl ethyl ketone was removed by azeotropic distillation, the residue was again cooled to room temperature and 25% ammonia water was added until the pH 8 to 9 was achieved. Then, water was added to adjust solid content to 50% by weight to obtain 1001 g of a ketone-modified resorcinol-formalin resin having a reduced content of resorcinol and resorcinol-formalin resins of resorcinol pentanuclear or higher nuclear bodies (content of resorcinol: 8.3%, solid content: 500 g).

Figure 5:
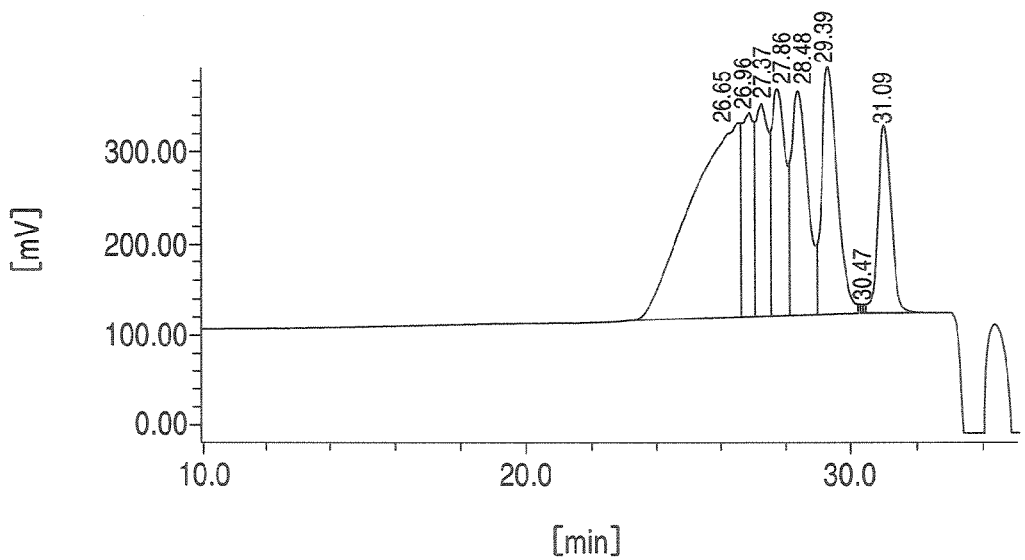
FIG. 5 is a gel permeation chromatogram of the resin obtained in Example 3.

The resulting ketone-modified resorcinol-formalin resin was dissolved in tetrahydrofuran and the solution was subjected to gel permeation chromatographic analysis, whereby the distribution of unreacted resorcinol to resorcinol pentanuclear and higher nuclear bodies was measured. The resulting chromatogram is shown in FIG. 5. The peak area ratios on the resulting chromatogram are as follows.

| | |
|---|---|
| Resorcinol | 8.3% |
| Resorcinol dinuclear body | 14.2% |
| Resorcinol trinuclear body | 13.2% |
| Resorcinol tetranuclear body | 11.4% |
| Resorcinol pentanuclear and higher nuclear bodies | 52.8% |

Comparative Example 1

After 280 g of water and 523.6 g of resorcinol were placed in a 2 L flask made of glass and the whole dissolved at 50° C., 1.2 g of p-toluenesulfonic acid was charged into the reaction vessel. While the reaction system was maintained at 120 to 125° C., 224 g of 37% formalin was added dropwise over a period of 300 minutes and, after the completion of the dropwise addition, the mixture was further stirred for 60 minutes to cause a reaction to proceed. After the temperature of the reaction system was cooled to room temperature, 792 mL of toluene was added to a neutralized solution neutralized with 0.7 g of 25% ammonia water, followed by extraction. The extraction step was repeated twice and 524 g of water was charged. After azeotropic distillation, the residue was cooled to obtain 893 g of a resorcinol-formalin resin (content of resorcinol: about 14%, solid content: 500 g).

Figure 6:
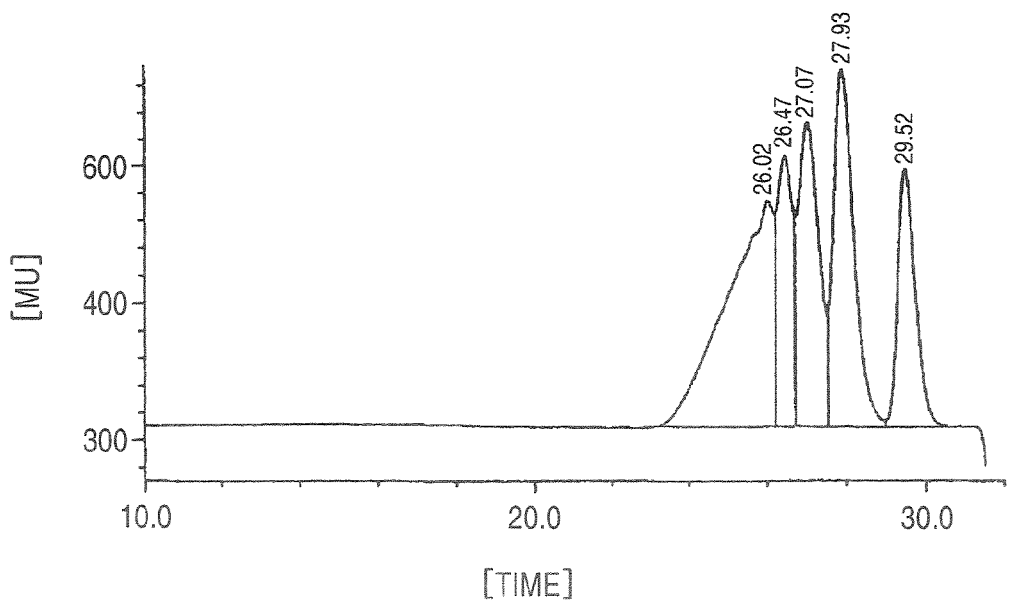
FIG. 6 is a gel permeation chromatogram of the resin obtained in Comparative Example 1.

The resulting resorcinol-formalin resin was dissolved in tetrahydrofuran and the solution was subjected to gel permeation chromatographic analysis, whereby the distribution of unreacted resorcinol to resorcinol pentanuclear and higher nuclear bodies was measured. The conditions for the analysis were the same as in Example 1. The resulting chromatogram is shown in FIG. 6. The peak area ratios on the resulting chromatogram are as follows.

| | |
|---|---|
| Resorcinol | 14.3% |
| Resorcinol dinuclear body | 23.8% |
| Resorcinol trinuclear body | 19.9% |
| Resorcinol tetranuclear body | 14.9% |
| Resorcinol pentanuclear and higher nuclear bodies | 27.1% |

While the invention has been described in detail and with reference to specific examples thereof, it will be apparent to one skilled in the art that various changes and modifications can be made therein without departing from the spirit and scope thereof.

The present application is based on Japanese Patent Application No. 2005-016604 filed on Jan. 25, 2005, and the contents thereof are incorporated herein by reference.

INDUSTRIAL APPLICABILITY

The ketone-modified resorcinol-formalin resin of the invention has a moderate flowability when transformed into an aqueous solution and has both a reduced content of resorcinol monomer and a reduced content of ketone-modified resorcinol-modified resin of resorcinol pentanuclear or higher nuclear bodies and resorcinol-formalin resin of resorcinol pentanuclear or higher nuclear bodies. Therefore, the resin gives less deterioration of working environment induced by sublimation of unreacted resorcinol upon use as an adhesive and has an excellent adhesive force, so that it is advantageous in view of cost and is useful as a tire adhesive and a rubber hose adhesive.

The invention claimed is:

1. A ketone-modified resorcinol-formalin resin, which is a resin (G) obtained by a process comprising:
adding and dissolving, into a water solvent, resorcinol (A) in an amount of 100 to 200 parts by weight relative to 100 parts by weight of water,
adding an organic acid or inorganic acid (B1) as a catalyst in an amount of 0.2 to 0.6 part by weight relative to 100 parts by weight of water,
adding 1 to 40% formalin (C) dropwise in a molar ratio relative to resorcinol (A) in terms of formaldehyde/resorcinol of 0.3 to 0.8 under stirring over a period of 1 to 300 minutes while maintaining the reaction system at 0 to 150° C.,
stirring the aqueous resorcinol formaldehyde reaction mixture for further 20 to 90 minutes after the completion of the dropwise addition of formalin to cause a reaction to proceed,
cooling the mixture after the further stirring,
neutralizing the cooled mixture with adding 1 to 30% ammonia water (D1) in an amount of 1.0 to 2.0 molar equivalents relative to the organic acid or inorganic acid (B1),
extracting the neutralized solution with an extracting solvent (E) in an amount of 1 to 5 equivalents relative to resorcinol (A),
repeating the extraction N times,
subjecting the remaining aqueous layer to azeotropic distillation to remove residual extracting solvent (E),
cooling the residue obtained after the azeotropic distillation to obtain a resorcinol-formalin condensation liquid (F),
adding 10 to 80 parts by weight of a liquid ketone (H) represented by the general formula [1] and 0.1 to 1.5 parts by weight of an organic or inorganic acid (B2) as a catalyst to 100 parts by weight of the condensation liquid (F),
elevating the temperature to 50 to 100° C., and continuing reaction for 5 to 24 hours while maintaining the temperature,
adding 10 to 50 parts by weight of water to 100 parts by weight of the reaction solution after the completion of the reaction,
removing by azeotropic distillation the unreacted liquid ketone (H) and water in an amount to be removed by the azeotropic distillation,
taking out the remaining water layer part, and
neutralizing the remaining water mixture with 1 to 30% ammonia water (D2), to obtain the resin (G),
wherein
N represents an integer of 2 to 5,
a peak area corresponding to resorcinol monomer is 3 to 9% and a peak area corresponding to resorcinol pentanuclear and higher nuclear bodies is 30 to 55% relative to the total peak area obtained by gel permeation chromatographic analysis of the resin (G):

[Chemical Formula 1]

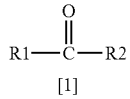

[1]

wherein
R1 and R2 are the same or different from each other and each represents a methyl group, an ethyl group, an n-propyl group, a 2-propyl group, an n-butyl group, a secondary-butyl group, an isobutyl group, or a tertiary-butyl group.

2. The ketone-modified resorcinol-formalin resin according to claim 1, wherein the 1 to 40% formalin (C) is intermittently added dropwise in a molar ratio relative to resorcinol (A) in terms of formaldehyde/resorcinol of 0.3 to 0.8 under stirring over a period of 20 to 300 minutes.

3. The ketone-modified resorcinol-formalin resin according to claim 1, which is a resin (G) obtained by adding 20 to 80 parts by weight of the liquid ketone (H) represented by the general formula [1] and 0.1 to 1.5 parts by weight of the organic or inorganic acid (B2) as a catalyst to 100 parts by weight of the resorcinol-formalin condensation liquid (F), carrying out the reaction for 5 to 24 hours at a temperature equal to or lower than azeotropic temperature of water and the liquid ketone (H), adding 10 to 50 parts by weight of water to 100 parts by weight of the reaction solution after the completion of the reaction, removing by azeotropic distillation the liquid ketone (H) and water in an amount to be removed by the azeotropic distillation, taking out the remaining water layer part, and neutralizing it with 1 to 30% ammonia water (D2) and, which has finally a reaction product concentration of 30 to 80% by weight and has an appropriate flowability.

4. The ketone-modified resorcinol-formalin resin according to claim 1, wherein the group R1 and R2 in the general formula [1] of the liquid ketone (H) represented by the general formula [1] are a methyl group and an ethyl group, respectively.

5. The ketone-modified resorcinol-formalin resin according to claim 1, wherein the liquid ketone (H) represented by the general formula [1] has a capability of dissolving a resorcinol-formalin resin in an amount of 1 g or more in 100 g of the ketone (H).

6. The ketone-modified resorcinol-formalin resin according to claim 1, wherein the liquid ketone (H) represented by the general formula [1] is used as a mixture of two or more kinds of the liquid ketones represented by the general formula [1].

7. The ketone-modified resorcinol-formalin resin according to claim 1, wherein the organic acid or inorganic acid (B2) is hydrochloric acid.

8. The ketone-modified resorcinol-formalin resin according to claim 1, wherein the mole number of formaldehyde in the formalin relative to the mole number of resorcinol (A) is in a molar ratio of formaldehyde/resorcinol of 0.5 to 0.8.

9. The ketone-modified resorcinol-formalin resin according to claim 1, wherein the time for dropwise addition of the formalin (C) is 20 to 120 minutes.

10. The ketone-modified resorcinol-formalin resin according to claim 1, wherein after the reaction with the liquid ketone (H) the reaction solution is adjusted to pH 4 to 7 with 1 to 30% ammonia water (D2) before the removal of the liquid ketone (H) by azeotropic distillation, and is then adjusted to pH 7 to 10 by neutralization with 1 to 30% ammonia water (D2) after the azeotropic distillation.

11. A process for producing a ketone-modified resorcinol-formalin resin, which is a resin (G) obtained by adding and dissolving, into a water solvent, resorcinol (A) in an amount of 100 to 200 parts by weight relative to 100 parts by weight of water, adding an organic acid or inorganic acid (B1) as a catalyst in an amount of 0.2 to 0.6 part by weight relative to 100 parts by weight of water, adding 1 to 40% formalin (C) dropwise in a molar ratio relative to resorcinol (A) in terms of formaldehyde/resorcinol of 0.3 to 0.8 under stirring over a period of 1 to 300 minutes while maintaining the reaction system at 0 to 150° C., stirring the mixture for further 20 to 90 minutes after the completion of the dropwise addition to cause a reaction to proceed, neutralizing the mixture with adding 1 to 30% ammonia water (D1) in an amount of 1.0 to 2.0 molar equivalents relative to the organic acid or inorganic acid (B1) after cooling, adding an extracting solvent (E) in an amount of 1 to 5 equivalents relative to resorcinol (A) to the reaction solution to effect extraction, repeating the extraction step N times, subjecting the remaining aqueous layer to azeotropic distillation to remove the residual extracting solvent (E), cooling the residue to obtain a resorcinol-formalin condensation liquid (F), adding 10 to 80 parts by weight of a liquid ketone (H) represented by the general formula [1] and 0.1 to 1.5 parts by weight of an organic or inorganic acid (B2) as a catalyst to 100 parts by weight of the condensation liquid (F), elevating the temperature to 50 to 100° C., continuing the reaction for 5 to 24 hours while maintaining the temperature, adding 10 to 50 parts by weight of water to 100 parts by weight of the reaction solution after the completion of the reaction, removing by azeotropic distillation the liquid ketone (H) and water in an amount to be removed by the azeotropic distillation, taking out the remaining water layer part, and neutralizing it with 1 to 30% ammonia water (D2), and wherein a peak area corresponding resorcinol monomer is 3 to 9% and a peak area corresponding to resorcinol pentanuclear and higher nuclear bodies is 30 to 55% relative to the total peak area obtained by gel permeation chromatographic analysis of the resin (G), provided that N represents an integer of 2 to 5:

[Chemical Formula 2]

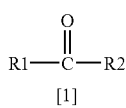

[1]

wherein R1 and R2 are the same or different from each other and each represents a methyl group, an ethyl group, an n-propyl group, a 2-propyl group, an n-butyl group, a secondary-butyl group, an isobutyl group, or a tertiary-butyl group.

12. The process for producing a ketone-modified resorcinol-formalin resin according to claim 11, wherein the 1 to 40% formalin (C) is intermittently added dropwise in a molar ratio relative to resorcinol (A) in terms of formaldehyde/resorcinol of 0.3 to 0.8 under stirring over a period of 20 to 300 minutes.

13. The process for producing a ketone-modified resorcinol-formalin resin according to claim 11, which is a resin (G) obtained by adding 20 to 80 parts by weight of the liquid ketone (H) represented by the general formula [1] and 0.1 to 1.5 parts by weight of the organic or inorganic acid (B2) as a catalyst to 100 parts by weight of the resorcinol-formalin condensation liquid (F), carrying out the reaction for 5 to 24 hours at a temperature equal to or lower than azeotropic temperature of water and the liquid ketone (H), adding 10 to 50 parts by weight of water to 100 parts by weight of the reaction solution after the completion of the reaction, removing by azeotropic distillation the liquid ketone (H) and water in an amount to be removed by the azeotropic distillation, taking out the remaining water layer part, and neutralizing it with 1 to 30% ammonia water (D2) and which has finally a reaction product concentration of 30 to 80% by weight and has an appropriate flowability.

14. The process for producing a ketone-modified resorcinol-formalin resin according to claim 11, wherein the group R1 and R2 in the general formula [1] of the liquid ketone (H) represented by the general formula [1] are a methyl group and an ethyl group, respectively.

15. The process for producing a ketone-modified resorcinol-formalin resin according to claim 11, wherein the liquid ketone (H) represented by the general formula [1] has a capability of dissolving a resorcinol-formalin resin in an amount of 1 g or more in 100 g of the ketone (H).

16. The process for producing a ketone-modified resorcinol-formalin resin according to claim 11, wherein the liquid ketone (H) represented by the general formula [1] is used as a mixture of two or more kinds of the liquid ketones represented by the general formula [1].

17. The process for producing a ketone-modified resorcinol-formalin resin according to claim 11, wherein the organic acid or inorganic acid (B2) is hydrochloric acid.

18. The process for producing a ketone-modified resorcinol-formalin resin according to claim 11, wherein the mole number of formaldehyde in the formalin relative to the mole number of resorcinol (A) is in a molar ratio of formaldehyde/resorcinol of 0.5 to 0.8.

19. The process for producing a ketone-modified resorcinol-formalin resin according to claim 11, wherein the time for dropwise addition of the formalin (C) is 20 to 120 minutes.

20. The process for producing a ketone-modified resorcinol-formalin resin according to claim 11, wherein after the reaction with the liquid ketone (H) the reaction solution is adjusted to pH 4 to 7 with 1 to 30% ammonia water (D2) before the removal of the liquid ketone (H) by azeotropic distillation, and is then adjusted to pH 7 to 10 by neutralization with 1 to 30% ammonia water (D2) after the azeotropic distillation.

* * * * *